(12) United States Patent
Gao et al.

(10) Patent No.: US 10,666,468 B2
(45) Date of Patent: May 26, 2020

(54) CHANNEL TRAINING METHOD, APPARATUS, AND SYSTEM

(71) Applicant: Huawei Technologies Co., Ltd., Shenzhen, Guangdong (CN)

(72) Inventors: Jianhe Gao, Wuhan (CN); Bo Gao, Wuhan (CN); Hongguang Zhang, Wuhan (CN); Shengmeng Fu, Wuhan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/227,366

(22) Filed: Dec. 20, 2018

(65) Prior Publication Data
US 2019/0123941 A1   Apr. 25, 2019

Related U.S. Application Data

(63) Continuation of application No. PCT/CN2016/088025, filed on Jun. 30, 2016.

(51) Int. Cl.
*H04L 25/03* (2006.01)
*H04Q 11/00* (2006.01)
(Continued)

(52) U.S. Cl.
CPC ....... *H04L 25/03019* (2013.01); *H04B 10/27* (2013.01); *H04J 14/08* (2013.01);
(Continued)

(58) Field of Classification Search
CPC .... H04L 25/03019; H04B 10/27; H04J 14/08; H04Q 2011/0064; H04Q 2011/0084; H04Q 2011/0088
(Continued)

(56) References Cited

U.S. PATENT DOCUMENTS

| 2010/0158530 A1* | 6/2010 | Soto | H04B 10/40 |
| | | | 398/79 |
| 2012/0230678 A1* | 9/2012 | In De Betou | H04L 7/041 |
| | | | 398/27 |

(Continued)

FOREIGN PATENT DOCUMENTS

| CN | 101789918 A | 7/2010 |
| CN | 102131134 A | 7/2011 |

(Continued)

OTHER PUBLICATIONS

Malik et al, "Adaptive Equalization Algorithms: an Overview", Mar. 2011, Ijacsa, vol. 2, No. 3, p. 64.*

(Continued)

*Primary Examiner* — Dalzid E Singh
(74) *Attorney, Agent, or Firm* — Kilpatrick Townsend & Stockton LLP

(57) ABSTRACT

The present disclosure relates to the field of communications technologies, and discloses a channel training method, apparatus, and system, so as to resolve a problem in which a newly added ONU in a PON cannot be registered and go online in time. In embodiments of the present disclosure, a first moment for triggering channel training is determined; normal data is stopped sending from the first moment and a training frame is generated; and then the training frame is sent to all ONUs in a PON, so that a target ONU trains an automatic adaptive equalizer based on the training frame, where the target ONU is at least one of all the ONUs in the PON. The solutions provided in the embodiments of the present disclosure are applicable to the equalizer training the ONU.

11 Claims, 10 Drawing Sheets

(51) Int. Cl.
*H04B 10/27* (2013.01)
*H04J 14/08* (2006.01)

(52) U.S. Cl.
CPC . *H04Q 11/0067* (2013.01); *H04Q 2011/0064* (2013.01); *H04Q 2011/0084* (2013.01); *H04Q 2011/0088* (2013.01)

(58) Field of Classification Search
USPC .......................................................... 398/66
See application file for complete search history.

(56) References Cited

U.S. PATENT DOCUMENTS

| | | | |
|---|---|---|---|
| 2016/0006510 A1* | 1/2016 | Chen | H04B 10/25133 398/66 |
| 2016/0072607 A1 | 3/2016 | Wen | |
| 2016/0142153 A1* | 5/2016 | Zamani | H04B 10/6161 398/202 |
| 2019/0089463 A1* | 3/2019 | Zhang | H04B 10/5161 |

FOREIGN PATENT DOCUMENTS

| | | |
|---|---|---|
| CN | 103634054 A | 3/2014 |
| CN | 104144360 A | 11/2014 |
| WO | 2014180495 A1 | 11/2014 |

OTHER PUBLICATIONS

"IEEE Standard for Ethernet Amendment 2: Physical Layer Specifications and Management Parameters for 100 Gb/s Operation Over Backplanes and Copper Cables", IEEE Computer Society, IEEE Std 802.3bj™-2014, Sep. 2014, 368 pages.
Hongguang Zhang et rl:"30km downstream transmission using 425Gb/s 4-PAM modulation with commercial 10Gbps TOSA and ROSA for 100Gb/s-PON", OFC 2014, OSA, Mar. 9, 2014, pp. 1-3, XP032633450.
Man Jiangwei et al_:"High speed optical intercorrects with PAM4 modulation for short-reach applications", 2015 IEEE CPMT Symposium Japan(ICSJ), IEEE, Nov. 9, 2015, XP032833389, 3 pages.
Johannes Von Hoyningen-Huene et al: "Nonlinearity Equalization Techniques for DML—Transmission Impairments Oct. 2, 2012—2-Chair far Communications Lehrstuhl fuer Nachrichten—und Uebertragungstechnik Motivation", Jan. 1, 2012, XP055587965, 18 pages.

\* cited by examiner

CHANNEL TRAINING METHOD, APPARATUS, AND SYSTEM

CROSS-REFERENCE TO RELATED APPLICATIONS

This application is a continuation of International Application No. PCT/CN2016/088025, filed on Jun. 30, 2016, the disclosure of which is hereby incorporated by reference in its entirety.

TECHNICAL FIELD

The present application relates to the field of communications technologies, and in particular, to a channel training method, apparatus, and system.

BACKGROUND

In the passive optical network (PON) technology, an office-end optical line terminal (OLT) of an access network is connected to a user optical network unit (ONU) only by using a passive device such as a fiber or an optical splitter with no need to use an equipment room and a power supply. As shown in FIG. 1, the PON includes one OLT and a plurality of ONUs. A feeder between the OLT and the ONU is a feeder fiber; a passive optical splitter is configured to fuse a plurality of fibers; and a drop is a distribution fiber. In a PON operating process, when downstream data transmission is performed, the passive optical splitter divides one group of signals delivered by the OLT into N groups of signals, and sends them to all connected ONUs. The ONU selectively receives downstream data including an ID that is the same as an ID of the ONU. When upstream data transmission is performed, the passive optical splitter combines optical signals sent by the N groups of ONUs into one group of optical signals by using Time Division Multiple Access (TDMA), divides an upstream transmission time into several timeslots, and arranges only one ONU in each timeslot to send information as packets. Each ONU may obtain timing information from a downstream signal sent by the OLT, and then send an upstream grouping signal in a timeslot specified by the OLT, so as to avoid a conflict between ONUs. A PON based on this transmission principle is a TDM-PON.

Currently, the PON mainly includes an Ethernet passive optical network (EPON) and a gigabit passive optical network (GPON), and the EPON includes 10G EPON. As user requirements on a bandwidth become higher, a 10G bandwidth of the 10G EPON becomes increasingly insufficient, and a Next Generation Ethernet Passive Optical Network (NGEPON) begins to develop. The NGEPON is also referred to as a 100G EPON, that is, a high-speed PON. To improve the bandwidth while reducing costs, the ONU may use a 10G low-speed optical device to send and receive 25 Gbps data. However, performance of a high-speed optical signal may deteriorate when being transmitted in an existing fiber, and consequently, a bit error rate is relatively high when the optical signal is received by the ONU, thereby causing a relatively high power penalty.

SUMMARY

Embodiments of the present disclosure provide a channel training method, apparatus, and system, so as to resolve a problem in which a newly added ONU in a PON cannot be registered and go online in time.

The following technical solutions are used in the embodiments of the present disclosure to achieve the foregoing objective.

According to a first aspect, an embodiment of the present disclosure provides a channel training method, where the method is applied to a passive optical network PON, the PON includes an optical line terminal OLT and an optical network unit ONU, the ONU includes an automatic adaptive equalizer, and the method includes: determining a first moment for triggering channel training; then stopping sending normal data from the first moment; and generating a training frame; and sending the training frame to all ONUs in the PON, so that a target ONU trains the automatic adaptive equalizer based on the training frame, where the target ONU is at least one of all the ONUs.

In this embodiment of the present disclosure, a receiving sensitivity of an optical module of the ONU may be improved, so that the optical module of the ONU receives an optical signal with optimal operation performance, thereby reducing a bit error rate in the received optical signal and reducing a power penalty.

In a possible design, the method includes: generating a control signal when the first moment arrives, where the control signal is used to trigger the channel training; and then stopping sending the normal data by using the control signal; and generating the training frame, where the training frame includes a training identifier and a training sequence.

In a possible design, the method includes: periodically triggering the channel training by using a timer, where a moment for triggering the channel training is the first moment; and stopping sending the normal data from each first moment; and generating the training frame, where the training frame includes a training identifier and a training sequence.

In a possible design, after the generating the training frame, the method further includes: replacing an idle codeword at a physical coding sublayer PCS of the OLT with the training frame; and then bypassing a 64B/66B coding module and a scrambling module at the PCS.

In this method, before the training frame is sent, the 64B/66B coding module and the scrambling module at the PCS are bypassed. This avoids damaging the training sequence when the 64B/66B coding module performs coding on the training frame and when the scrambling module performs scrambling on the training frame, so that the ONU may receive a correct training sequence, and train the automatic adaptive equalizer based on the training sequence, so as to ensure that the ONU may be registered and go online in time, reduce the bit error rate in the optical signal received by the ONU, and reduce a power penalty.

In a possible design, after the generating the training frame, the method further includes: performing 64B/66B decoding and descrambling on the training frame; and then replacing an idle codeword at a physical coding sublayer PCS of the OLT with the training frame obtained after the 64B/66B decoding and the descrambling.

In this embodiment of the present disclosure, after replacing the idle codeword with the training frame obtained after the 64B/66B decoding and the descrambling, the training frame may be processed by each function module at the PCS. After the 64B/66B coding and the scrambling at the PCS are performed on the training frame, an original training frame may be restored. The original training frame is transmitted to the ONU by using the fiber, so that the ONU may identify the correct training sequence from the original training frame, and train the automatic adaptive equalizer based on the correct training sequence.

In a possible design, the method further includes: adding a re-training command to a downstream message when an abnormal ONU is detected, where the re-training command is used to instruct the abnormal ONU to reset the automatic adaptive equalizer, and the abnormal ONU is an ONU whose receiving bit error rate reaches a preset value; and then determining a moment at which sending of the downstream message carrying the re-training command is complete as the first moment for triggering the channel training.

In this embodiment of the present disclosure, when it is detected that the receiving bit error rate of the ONU increases, the channel training process may be re-triggered, so that after the channel training, the ONU can improve the receiving sensitivity of the optical module in the ONU, correctly receive the data, reduce the receiving bit error rate, and improve network performance.

According to a second aspect, this application provides a channel training apparatus, including units or means used to perform each step of the first aspect.

According to a third aspect, this application provides a channel training apparatus, including a processor and a memory, where the memory is configured to store a program, and the processor is configured to invoke the program stored in the memory, so as to perform the method provided in the first aspect of this application.

According to a fourth aspect, this application provides a channel training system, including an optical network unit ONU, a passive optical splitter, and an optical line terminal OLT of the second aspect.

According to a fifth aspect, this application provides a channel training apparatus, including at least one processing element (or a chip) configured to perform the method of the first aspect.

According to a sixth aspect, this application provides a channel training program, where the program is used to perform the method of the first aspect when being executed by the processor.

According to a seventh aspect, this application provides a program product, for example, a computer readable storage medium, which includes the program of the sixth aspect.

In the foregoing aspects, sending of the normal data is stopped from the first moment, and at this moment, the training frame starts to be sent. After receiving the training frame, the ONU uses the training sequence in the training frame to train the automatic adaptive equalizer. This can improve a receiving sensitivity of an optical module of the ONU, so that the optical module of the ONU receives an optical signal with optimal operation performance, thereby reducing a bit error rate in the received optical signal and reducing a power penalty.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 2:
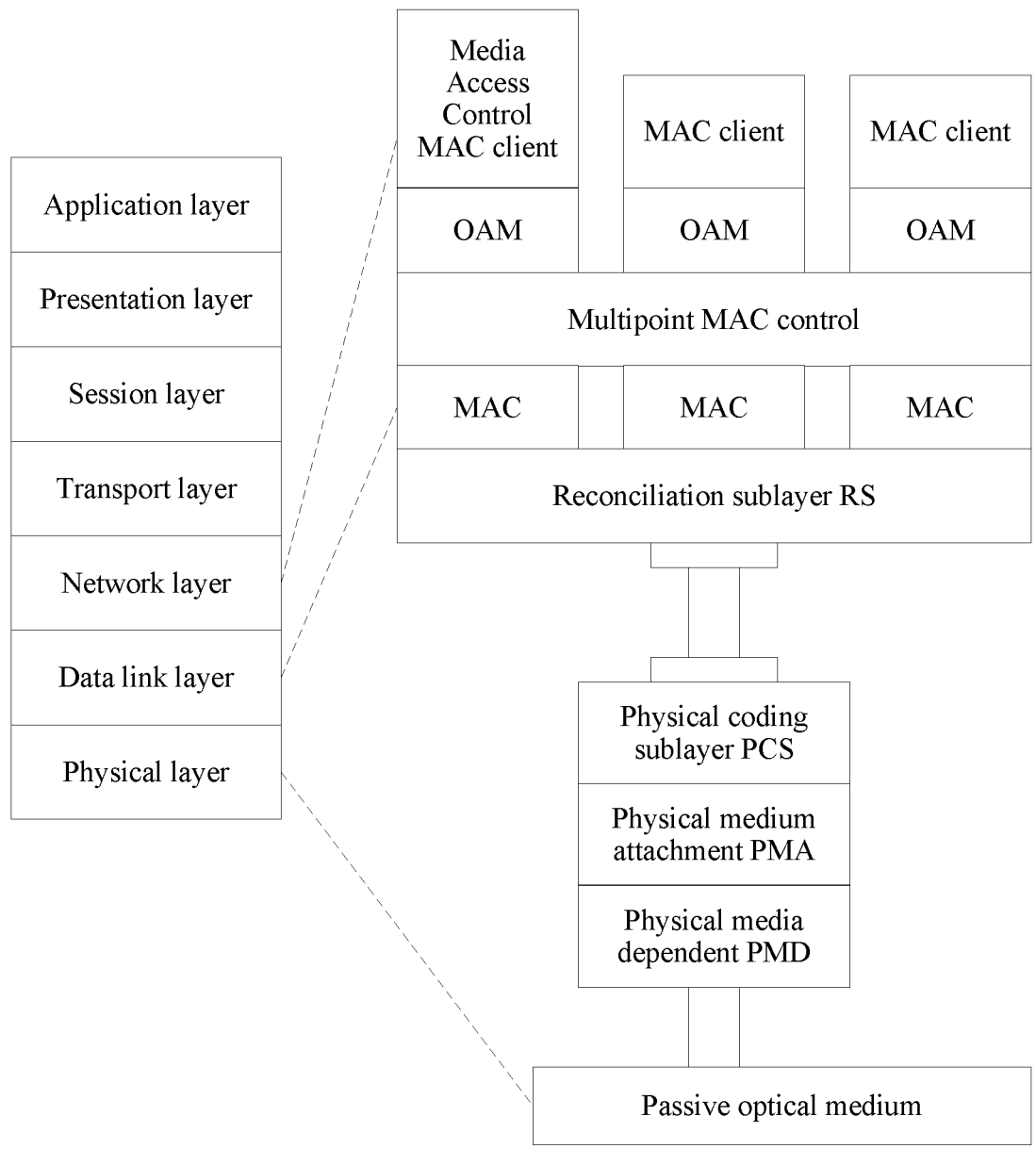
FIG. 2 is a schematic diagram of an EPON network layering model according to an embodiment of the present disclosure.

For ease of understanding, a network to which the embodiments of the present disclosure are applied is first described. The embodiments of the present disclosure are intended to resolve a problem in which a bit error rate in an optical signal received by an ONU in a 100G EPON is relatively high, thereby causing a relatively high power penalty. Network function division of the 100G EPON is similar to network function division of an existing EPON. An EPON network layering model is shown in FIG. 2.

A Media Access Control (MAC) sublayer is used to encapsulate data sent by an upper layer into a frame structure of the Ethernet, and send and receive the data.

A reconciliation sublayer (RS) is used to transmit data sent by the MAC to a physical layer device (PHY) by using an electrical interface.

A physical coding sublayer (PCS) is located between the RS and a physical medium attachment (PMA) sublayer, is used to perform a line encoding function, and also provides a forward error correction (FEC) function.

Figure 3:
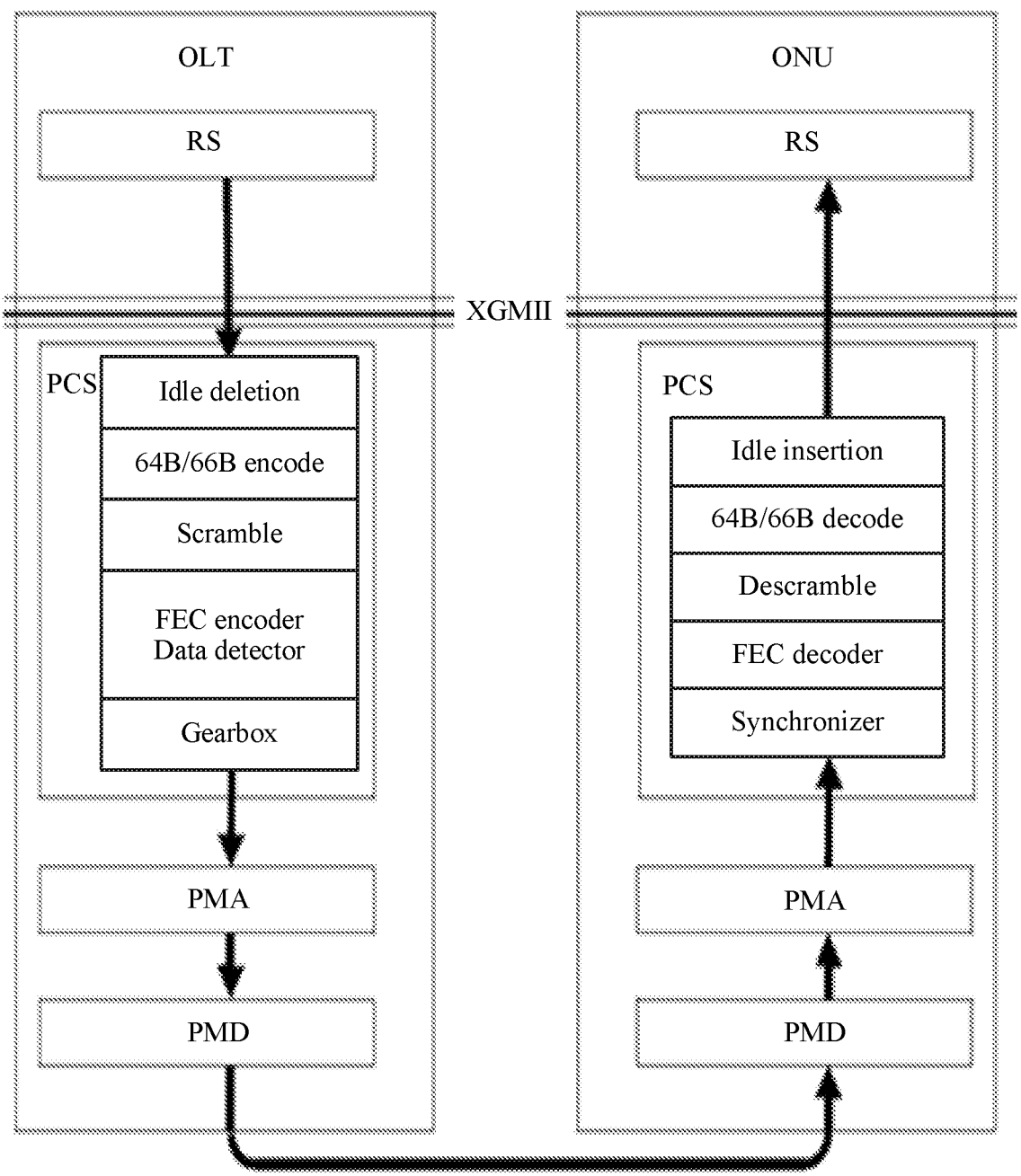
FIG. 3 is a schematic diagram of a logical structure of an EPON system according to an embodiment of the present disclosure.

With reference to function modules of a 10G EPON system, the following describes a process of data transmission between the OLT and the ONU. The function modules of the 10G EPON system are shown in FIG. 3. MAC (which is not shown in FIG. 3) in the OLT may insert some idle control codewords based on an electrical interface specification when sending data by using the RS interface. These idle control codewords may be sent to the PCS, and then the PCS may delete these idle control codewords based on a specific rule, so as to reserve space for subsequently inserting check data. Then, the PCS may perform 64B/66B coding and scrambling on the received data, and the data enters an FEC function module. The FEC function module performs FEC coding on the data, and adds the check data. After the foregoing operations are performed, the data is transmitted to a fiber through a Gearbox (an interface converter), a PMA interface, and a physical media dependent (PMD) interface. The fiber transmits the data to the ONU, and the ONU processes the received data in a manner which is opposite to the processing performed by the OLT on the data, so as to restore the data sent by the MAC of the OLT.

Figure 1:
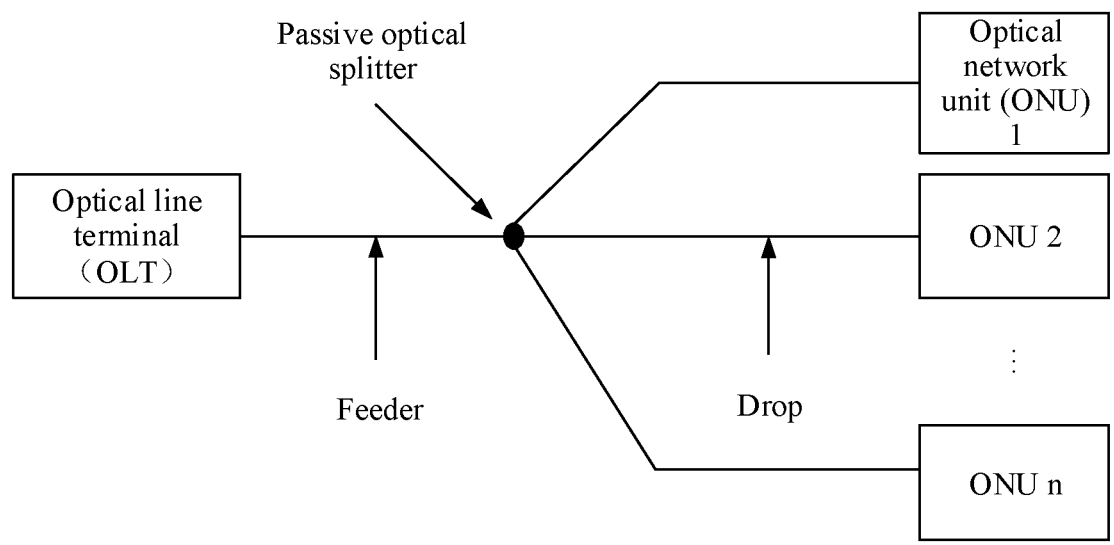
FIG. 1 is a schematic diagram of a logical structure of a PON network according to the background of the present disclosure.
Figure 4:
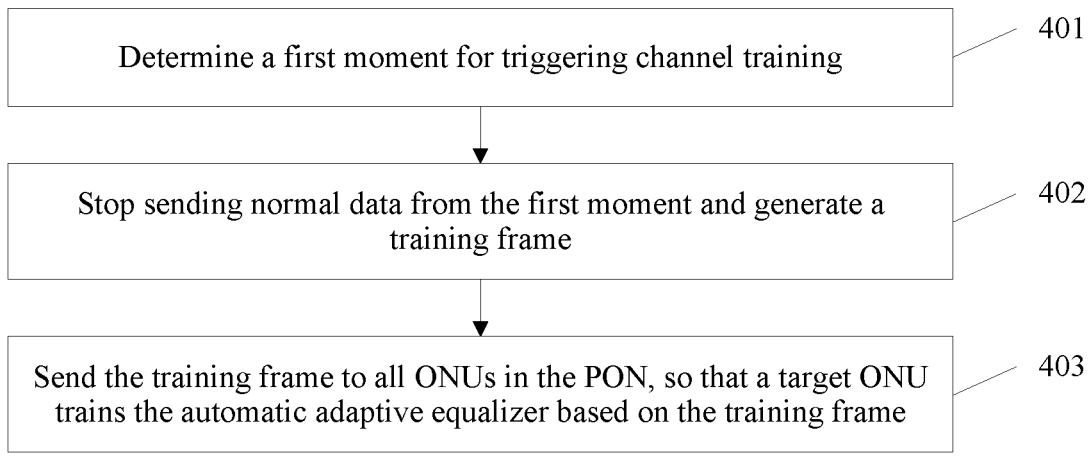
FIG. 4 is a flowchart of a channel training method according to an embodiment of the present disclosure.

Based on the foregoing description, in the PON system, performance of a high-speed optical signal may deteriorate when being transmitted in an existing fiber, and consequently, a bit error rate in the optical signal received by the ONU is relatively high, thereby causing a relatively high power penalty. To reduce the bit error rate in the optical signal received by the ONU, an automatic adaptive equalizer of the ONU needs to be trained before the ONU is registered, so as to improve a receiving sensitivity of the ONU. Based on this, an embodiment of the present disclosure provides a channel training method, and the method is applied to a passive optical network PON, where a structure of the PON is shown in FIG. 1. The method is specifically applied to a 100G EPON. The 100G EPON includes the OLT and the ONU, and the ONU includes the automatic adaptive equalizer. The automatic adaptive equalizer may be integrated in an optical module of the ONU, or may be disposed independently of the optical module. As shown in FIG. 4, the method includes the following steps.

401. Determine a first moment for triggering channel training.

The MAC in the OLT determines the first moment for triggering the channel training. The MAC may determine, based on a preset rule or a time interval, whether the channel training needs to be triggered next. It may be understood that when a new ONU is added, the OLT needs to trigger the channel training for the newly added ONU. A specific implementation method is: receiving a channel training triggering instruction entered by a user, and when the instruction is received, determining that a moment receiving the instruction is the first moment for triggering the channel training; or periodically triggering, by the MAC, the channel training, for example, triggering the channel training once every minute.

It should be noted that, in this embodiment of the present disclosure, the first moment for triggering the channel training is determined based on the preset rule, and a specific channel training triggering method is not limited in the present disclosure.

402. Stop sending normal data from the first moment, and generate a training frame.

The training frame includes a training identifier and a training sequence. The training identifier is a start identifier of the training frame. When the ONU receives data and identifies the training identifier, it may be determined that a received data frame is not a common data frame, but a training frame that is used to bear the training sequence, so that the automatic adaptive equalizer in the ONU finds a start moment of the training frame. The training sequence is usually a pseudo random data bit stream of a specific length.

When the first moment for triggering the channel training arrives, the MAC may generate the training frame. A transmission channel used to send the normal data may be occupied to transmit the training frame, and therefore, the MAC may stop sending the normal data to avoid an error in transmission of normal data. It may be understood that the MAC may still send the normal data based on an existing procedure if the first moment does not arrive.

403. Send the training frame to all ONUs in the PON, so that a target ONU trains the automatic adaptive equalizer based on the training frame.

A function of the automatic adaptive equalizer is adjusting a receiving sensitivity of an optical module of the ONU. The optical module of the ONU may receive an optical signal with optimal operation performance after the training frame is used to train the automatic adaptive equalizer.

It should be noted that the OLT sends downstream data in a broadcast manner, that is, each ONU in the PON network can receive the training frame sent by the OLT. After receiving the downstream data sent by the OLT, the ONU that is newly added to the PON may determine whether the training identifier is included in the downstream data. When identifying the training identifier, the ONU may use, based on the preset rule, bit data of a specific length that is obtained after the training identifier as training data. The automatic adaptive equalizer of the ONU calculates a configuration coefficient of the automatic adaptive equalizer based on the training data, and applies the calculated configuration coefficient to the automatic adaptive equalizer, so as to adjust the receiving sensitivity of the optical module of the ONU to a maximum value, so that the optical module of the ONU receives the optical signal with optimal operation performance. After completing the training, a registration message sent by the OLT may be correctly received, and a normal registration procedure is performed. When the original and normally operating ONU identifies the training identifier, the equalizer may be slightly adjusted based on the training sequence, or the training frame is directly neglected. This may not affect receiving of the normal data.

It should be further noted that the OLT may continue to send the normal data after determining that the training frame is sent.

According to the channel training method provided in this embodiment of the present disclosure, the first moment for triggering the channel training is determined; then sending of the normal data is stopped from the first moment and the training frame is generated; and the training frame is sent to all ONUs in the PON, so that the target ONU trains the automatic adaptive equalizer based on the training frame. Compared with the prior art, in which performance of a high-speed optical signal may deteriorate when being transmitted in an existing fiber, and consequently, a bit error rate in the optical signal received by the ONU is relatively high, thereby causing a relatively high power penalty, in this embodiment of the present disclosure, the first moment at which the channel training needs to be triggered is determined as the first moment after the system is powered on and operates normally. For example, a moment at which the ONU is connected may be determined as the first moment. Sending of the normal data is stopped from the first moment, and at this moment, the training frame starts to be sent, which may not damage the normal data. After receiving the training frame, the ONU uses the training sequence in the training frame to train the automatic adaptive equalizer, so as to improve a receiving sensitivity of the optical module of the ONU, so that the optical module of the ONU receives an optical signal with optimal operation performance, thereby reducing a bit error rate in the received optical signal and reducing a power penalty.

Figure 5:
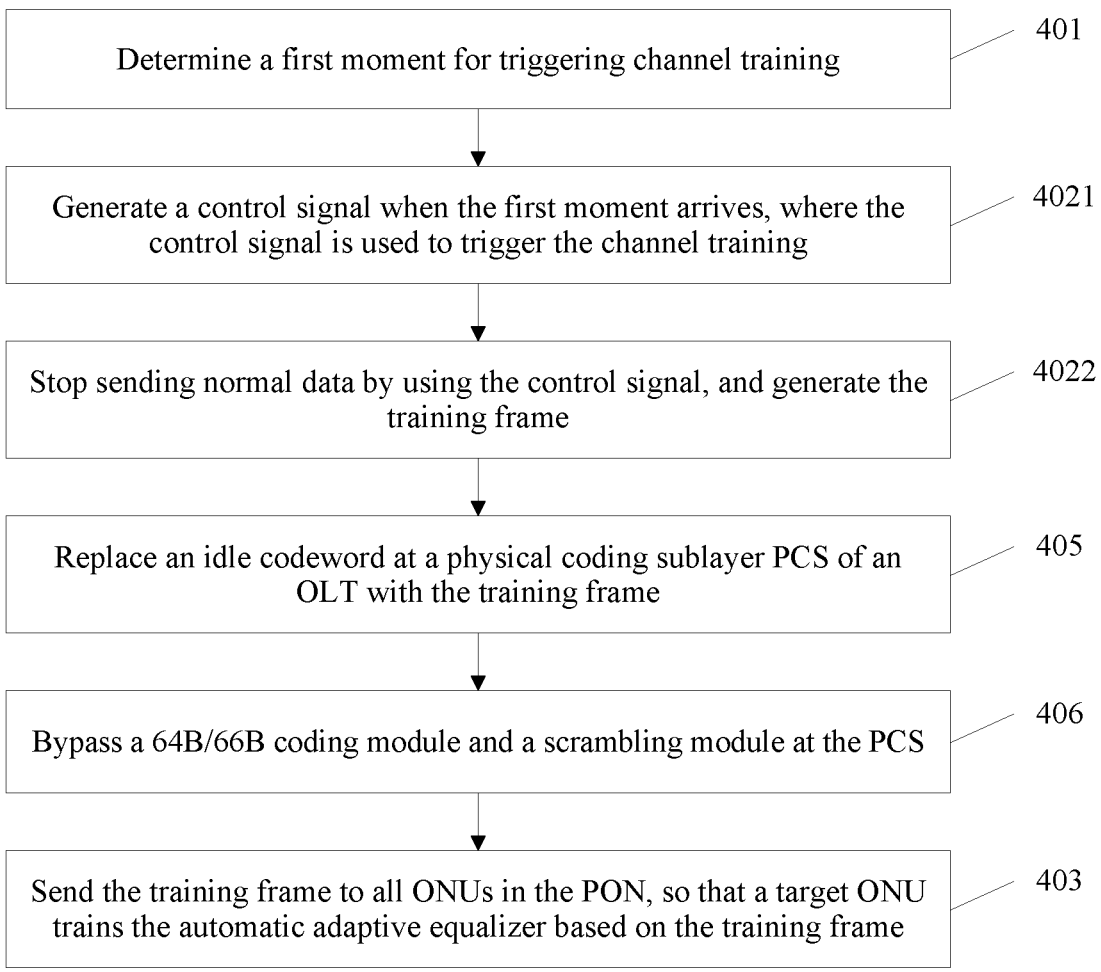
FIG. 5 is a flowchart of another channel training method according to an embodiment of the present disclosure.

With reference to the method procedure shown in FIG. 4, the following describes, in detail, a channel training triggering method and a training frame sending method in this embodiment of the present disclosure. In an implementation provided in this embodiment of the present disclosure, the MAC in the OLT may be used to send a control signal to the PCS, so as to trigger a channel training process. As shown in FIG. 5, the stopping sending normal data from the first moment, and generating a training frame in the foregoing step 402 may be specifically implemented as step 4021 and step 4022.

4021. Generate the control signal when the first moment arrives, where the control signal is used to trigger the channel training.

Specifically, when the MAC in the OLT determines that the first moment arrives, and the channel training needs to be triggered, the MAC may generate the control signal, and send the control signal to the PCS.

4022. Stop sending the normal data by using the control signal, and generate the training frame.

After the channel training is triggered, the MAC may stop sending the normal data, and generate the training frame by using the control signal to control a newly added training module at the PCS.

After the training frame is generated, the training frame needs to be sent to the ONU. The training frame needs to pass through each function module in the OLT shown in FIG. 3 for transmission. When a single wavelength rate of the 100G EPON is increased to 25 Gbps or higher, the FEC function needs to be started for downstream data transmission. Generally, a size of the training frame may not exceed 1K bits, and one FEC code may bear the downstream data. Therefore, integrity of the training identifier and the training sequence in the training frame may not be damaged when FEC coding is performed on the training frame. Based on this, to ensure that the ONU can receive the training frame, step 405 and step 406 need to be performed after the training frame is generated.

405. Replace an idle codeword at a physical coding sublayer PCS of the OLT with the training frame.

In this step, specifically, after generating the training frame, the newly added training module of the PCS replaces, in a PCS Idle deletion module, the idle codeword with the training identifier and the training sequence.

406. Bypass a 64B/66B coding module and a scrambling module at the PCS.

Figure 6:
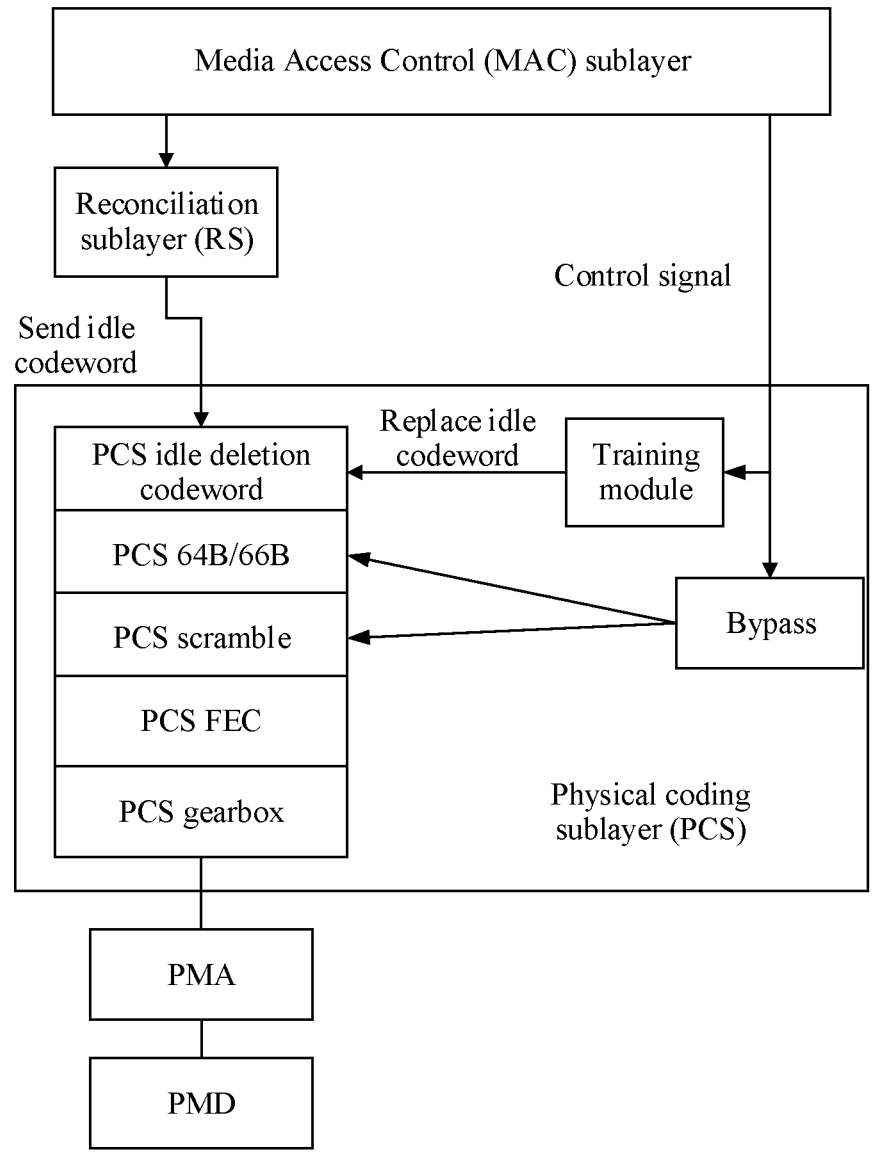
FIG. 6 is a schematic diagram of a channel training method according to an embodiment of the present disclosure.

It should be noted that when the channel training needs to be performed, the PCS may receive the control signal sent by the MAC, and bypass the 64B/66B coding module and the scrambling module based on the control signal, so that the data frame is directly transmitted to a PCS FEC module by the PCS Idle deletion module without the 64B/66B coding and scrambling processes. This avoids damaging the training sequence in the training frame when the 64B/66B coding module and the scrambling module process the training frame. A schematic diagram of the training sequence sending method is shown in FIG. 6. After receiving the training frame, the PCS FEC module performs FEC coding on the training frame, and adds check data. Then the training frame is transmitted to the fiber by using a PCS Gearbox, PMA interface, and PMD interface, and the training frame is transmitted to all ONUs in the PON by using the fiber.

In this embodiment of the present disclosure, before the training frame is sent, the 64B/66B coding module and the scrambling module at the PCS are bypassed. This avoids damaging the training sequence when the 64B/66B coding module performs coding on the training frame and when the scrambling module performs scrambling on the training frame, so that the ONU may receive a correct training sequence, and train the automatic adaptive equalizer based on the training sequence, so as to ensure that the ONU may be registered and go online in time, reduce the bit error rate in the optical signal received by the ONU, and reduce a power penalty.

Figure 7:
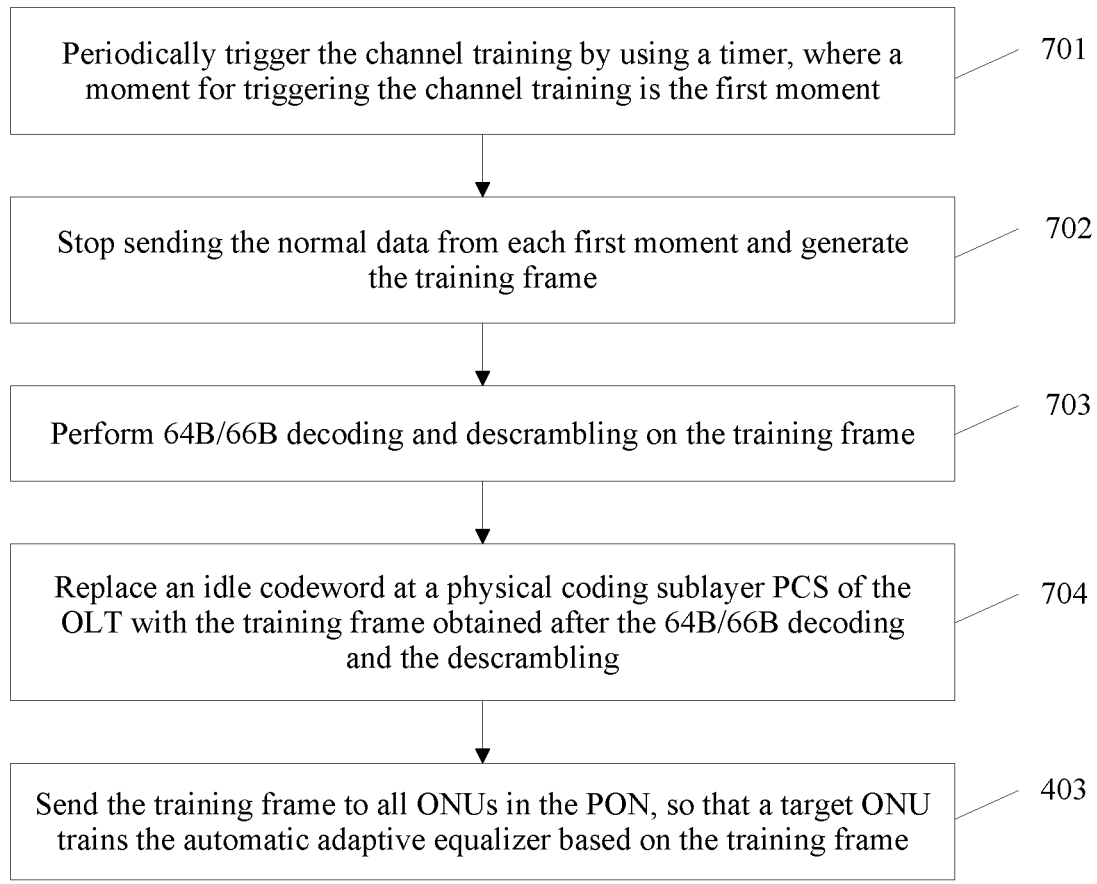
FIG. 7 is a flowchart of another channel training method according to an embodiment of the present disclosure.

In another implementation provided in this embodiment of the present disclosure, a timer may be used to periodically trigger the channel training process. As shown in FIG. 7, the foregoing step 401 and step 402 may be specifically implemented in step 701 and step 702.

701. Periodically trigger the channel training by using the timer, where a moment for triggering the channel training is the first moment.

Figure 8:
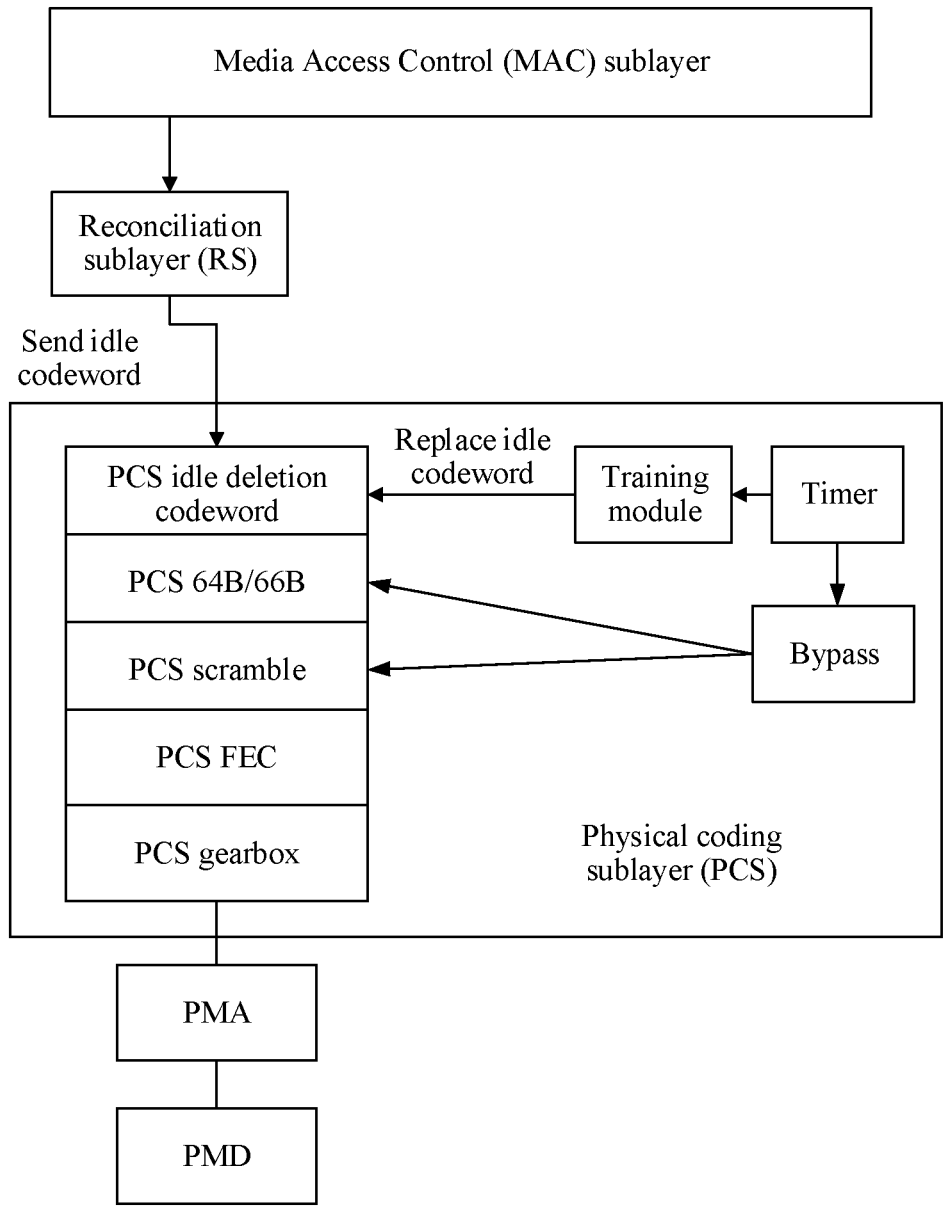
FIG. 8 is a schematic diagram of another channel training method according to an embodiment of the present disclosure.

It should be noted that, in this embodiment of the present disclosure, the timer may be used to trigger the channel training process, so as to replace the control signal in the method procedure shown in FIG. 5. FIG. 8 is a schematic diagram of a specific method. The timer in this step is a timer at the PCS of the OLT, and the timer at the PCS may periodically trigger the channel training.

702. Stop sending the normal data from each first moment, and generate the training frame.

It should be noted that, to ensure that transmission of the normal data sent by the MAC does not conflict with training frame transmission, the MAC and the timer at the PCS need to keep strict clock synchronization. Each time the timer at the PCS triggers the channel training, the MAC stops sending the normal data, and triggers, after the timer triggers the channel training, the newly added training module to generate the training frame.

To ensure that the ONU can receive the training frame, step 703 and step 704 need to be performed after the training frame is generated.

703. Perform 64B/66B decoding and descrambling on the training frame.

When the training identifier and the training sequence that are agreed by the OLT and the ONU in advance may not change, the PCS may perform the 64B/66B decoding and the descrambling on the training frame after generating the training frame.

704. Replace an idle codeword at a physical coding sublayer PCS of the OLT with the training frame obtained after the 64B/66B decoding and the descrambling.

It may be understood that after replacing the idle codeword with the training frame obtained after the 64B/66B decoding and the descrambling, the training frame may be processed by each function module at the PCS. After the 64B/66B coding and the scrambling at the PCS are performed on the training frame, an original training frame may be restored. The original training frame is transmitted to the ONU by using the fiber, so that the ONU may identity the correct training sequence from the original training frame, and train the automatic adaptive equalizer based on the correct training sequence.

It should be further noted that step 701 and step 702 may be combined with the foregoing step 405 and step 406 to form an implementation, in which the timer at the PCS replaces the control signal to trigger the channel training process. Likewise, the foregoing step 4021 and step 4022 may be combined with step 703 and step 704 to form another implementation.

In this embodiment of the present disclosure, the 64B/66B decoding and the descrambling are first performed on the training frame before the training frame is transmitted, so that the original training frame obtained after the 64B/66B coding and the scrambling at the PCS can be restored based on the training frame. The original training frame is sent to the ONU by using the fiber, so that the ONU correctly identifies the training sequence in the training frame. In addition, by using the channel training method of this embodiment of the present disclosure, a low-speed optical device may be used to receive a high-speed data signal, and ONU configuration costs are reduced.

Figure 9:
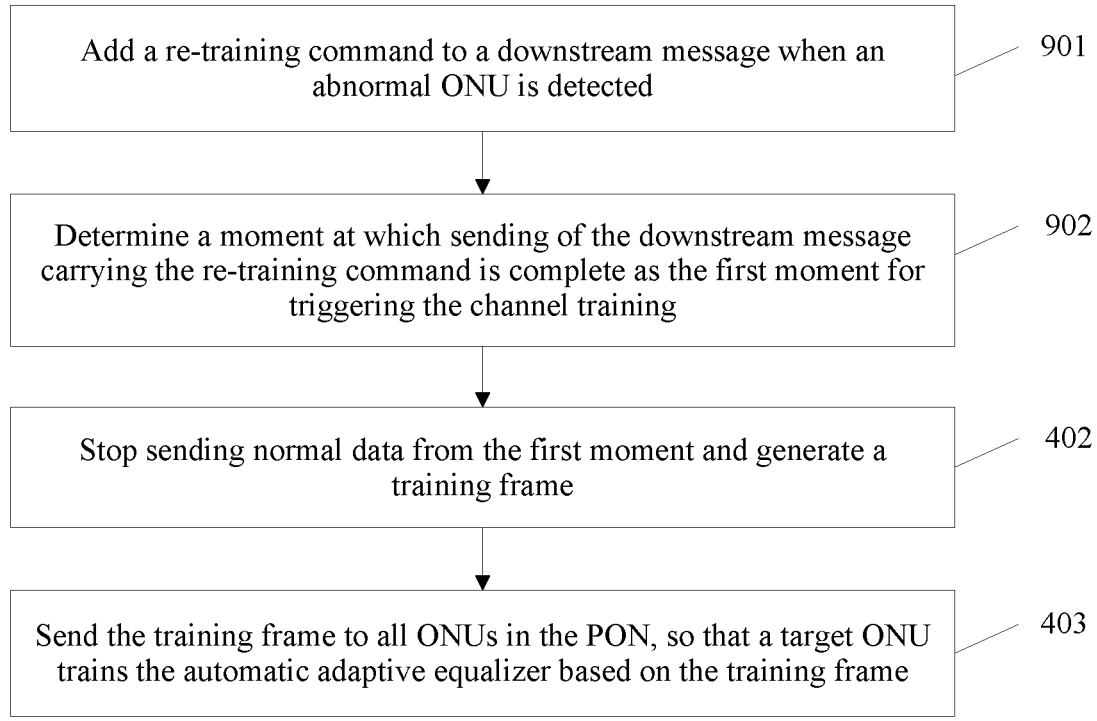
FIG. 9 is a flowchart of another channel training method according to an embodiment of the present disclosure.

It should be further noted that, in a normally operating process after the ONU is registered, the receiving bit error rate of the ONU may increase. For example, when a channel feature changes, the receiving bit error rate of the ONU may increase, for example, when a transmitter eye pattern ages with a laser in multi-level modulation. When detecting that the receiving bit error rate of the ONU increases, the OLT may force the ONU equalizer to reset, and control the ONU to re-perform the channel training. Based on this, in another implementation provided in this embodiment of the present disclosure, as shown in FIG. 9, the determining a first moment for triggering channel training in the foregoing step 401 may alternatively be implemented as step 901 and step 902.

901. Add a re-training command to a downstream message when an abnormal ONU is detected.

The re-training command is used to instruct the abnormal ONU to reset the automatic adaptive equalizer, and the abnormal ONU is an ONU whose receiving bit error rate reaches a preset value.

Specifically, the OLT may use a reserved field in a downstream Gate message to bear the re-training command. When receiving the Gate message and identifying the re-training command from the Gate message, the abnormal ONU may reset a tap coefficient of the automatic adaptive equalizer, so that the automatic adaptive equalizer may re-receive the training frame delivered by the OLT and re-perform the training of the automatic adaptive equalizer.

902. Determine a moment at which sending of the downstream message carrying the re-training command is complete as the first moment for triggering the channel training.

It may be understood that when the downstream message carrying the re-training command is sent, the ONU may reset the tap coefficient of the automatic adaptive equalizer. In this case, the abnormal ONU can re-receive the training frame delivered by the OLT. Therefore, the moment at which sending of the downstream message carrying the re-training command is complete is determined as the first moment for triggering the channel training.

After the first moment for triggering the channel training is determined, the channel training is still performed based on the method provided in the foregoing embodiment, and details are not described herein again.

According to the channel training method provided in this embodiment of the present disclosure, when it is detected that the receiving bit error rate of the ONU increases, the channel training process may be re-triggered, so that after the channel training, the ONU can improve the receiving sensitivity of the optical module in the ONU, correctly receive the data, reduce the receiving bit error rate, and improve network performance.

Figure 10:
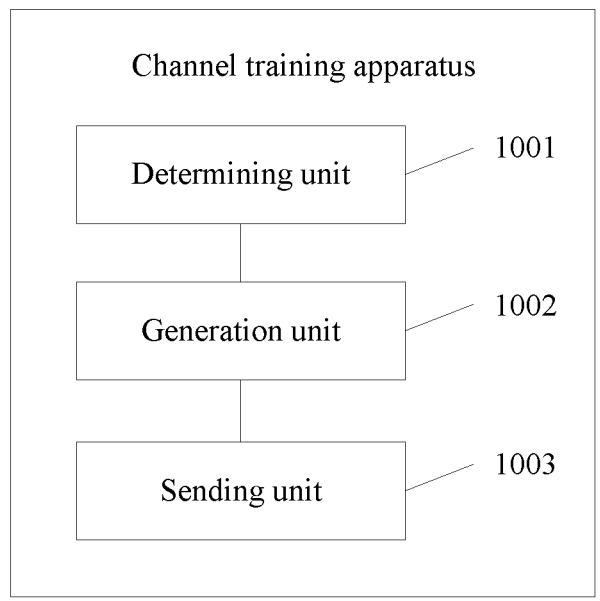
FIG. 10 is a schematic diagram of a logical structure of a channel training apparatus according to an embodiment of the present disclosure.

Corresponding to the foregoing method embodiment, an embodiment of the present disclosure further provides a channel training apparatus. The apparatus is applied to a passive optical network PON, the PON includes an optical line terminal OLT and an optical network unit ONU, and the ONU includes an automatic adaptive equalizer. As shown in FIG. 10, the apparatus includes a determining unit 1001, a generation unit 1002, and a sending unit 1003.

The determining unit 1001 is configured to determine a first moment for triggering channel training.

The generation unit 1002 is configured to: stop sending normal data from the first moment determined by the determining unit 1001, and generate a training frame.

The sending unit 1003 is configured to send the training frame generated by the generation unit 1002 to all ONUs in the PON, so that a target ONU trains the automatic adaptive equalizer based on the training frame, where the target ONU is at least one of all the ONUs.

In another embodiment of the present disclosure, the generation unit 1002 is further configured to: generate a control signal when the first moment arrives, where the control signal is used to trigger the channel training; and stop sending the normal data by using the control signal, and generate the training frame, where the training frame includes a training identifier and a training sequence.

In another embodiment of the present disclosure, the generation unit 1002 is further configured to: periodically trigger the channel training by using a timer, where a moment for triggering the channel training is the first moment; and stop sending the normal data from each first moment, and generate the training frame, where the training frame includes a training identifier and a training sequence.

Figure 11:
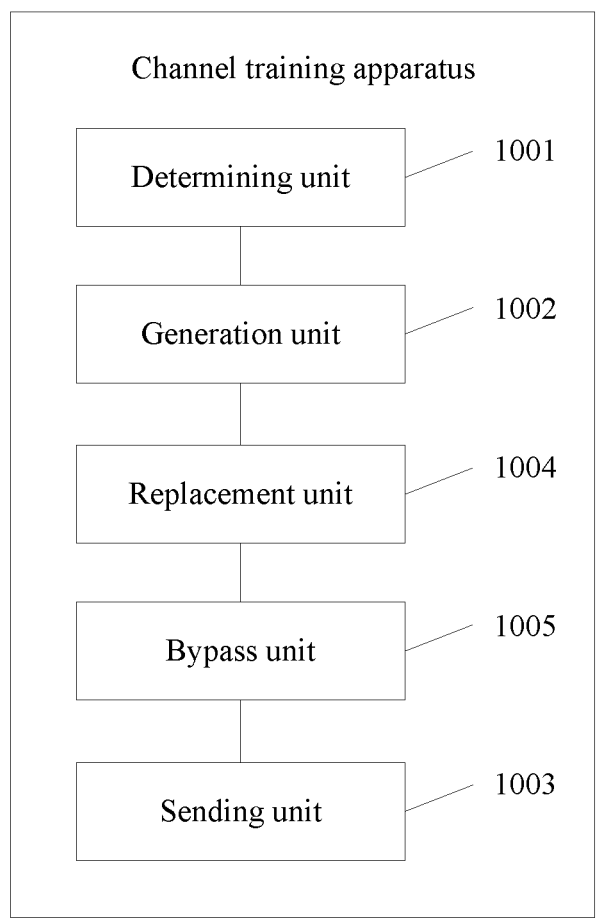
FIG. 11 is a schematic diagram of a logical structure of another channel training apparatus according to an embodiment of the present disclosure.

In a composition manner of the apparatus, as shown in FIG. 11, the apparatus further includes a replacement unit 1004 and a bypass unit 1005.

The replacement unit 1004 is configured to replace an idle codeword at a physical coding sublayer PCS of the OLT with the training frame.

The bypass unit 1005 is configured to bypass a 64B/66B coding module and a scrambling module at the PCS.

Figure 12:
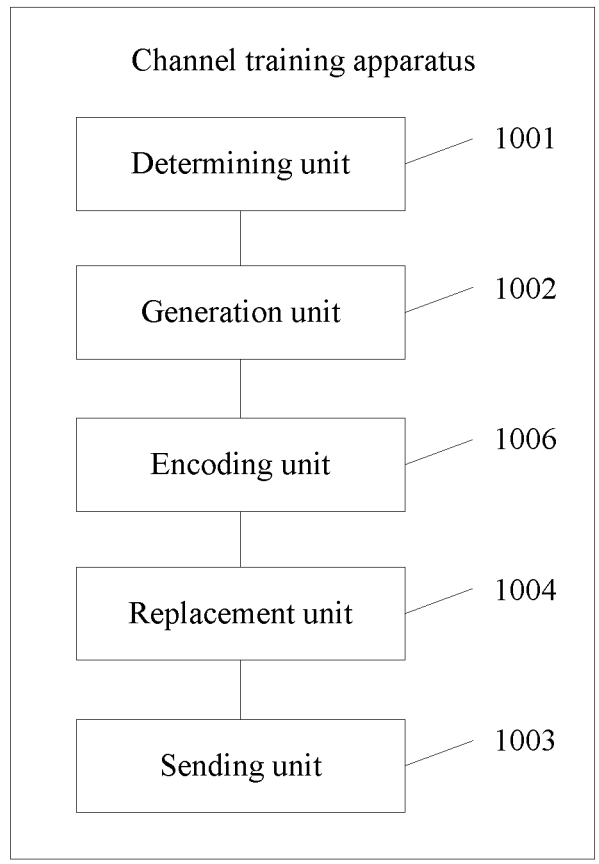
FIG. 12 is a schematic diagram of a logical structure of another channel training apparatus according to an embodiment of the present disclosure.

In a composition manner of the apparatus, as shown in FIG. 12, the apparatus further includes an encoding unit 1006.

The encoding unit 1006 is configured to perform 64B/66B decoding and descrambling on the training frame.

The replacement unit 1004 is configured to replace an idle codeword at a physical coding sublayer PCS of the OLT with the training frame obtained after the 64B/66B decoding and the descrambling.

In another embodiment of the present disclosure, the determining unit 1001 is further configured to: add a re-training command to a downstream message when an abnormal ONU is detected, where the re-training command is used to instruct the abnormal ONU to reset the automatic adaptive equalizer, and the abnormal ONU is an ONU whose receiving bit error rate reaches a preset value; and determine a moment at which sending of the downstream message carrying the re-training command is complete as the first moment for triggering the channel training.

According to the channel training apparatus provided in this embodiment of the present disclosure, the determining unit determines the first moment for triggering the channel training; then the generation unit stops sending the normal data from the first moment, and generates the training frame; and the sending unit sends the training frame to all ONUs in the PON, so that the target ONU trains the automatic adaptive equalizer based on the training frame. Compared with the prior art, in which performance of a high-speed optical signal may deteriorate when being transmitted in an existing fiber, and consequently, a bit error rate in the optical signal received by the ONU is relatively high, thereby causing a relatively high power penalty, in this embodiment of the present disclosure, the first moment at which the channel training needs to be triggered is determined as the first moment after the system is powered on and operates normally. For example, a moment at which the ONU is connected may be determined as the first moment. Sending of the normal data is stopped from the first moment, and at this moment, the training frame starts to be sent, which may not damage the normal data. After receiving the training frame, the ONU uses the training sequence in the training frame to train the automatic adaptive equalizer, so as to improve the receiving sensitivity of the optical module of the ONU, so that the optical module of the ONU receives an optical signal with optimal operation performance, thereby reducing the bit error rate in the received optical signal and reducing a power penalty.

An embodiment of the present disclosure further provides a channel training system. The system includes an ONU, a passive optical splitter, and an OLT described in FIG. 10 to FIG. 12, where the ONU includes an automatic adaptive equalizer.

Figure 13:
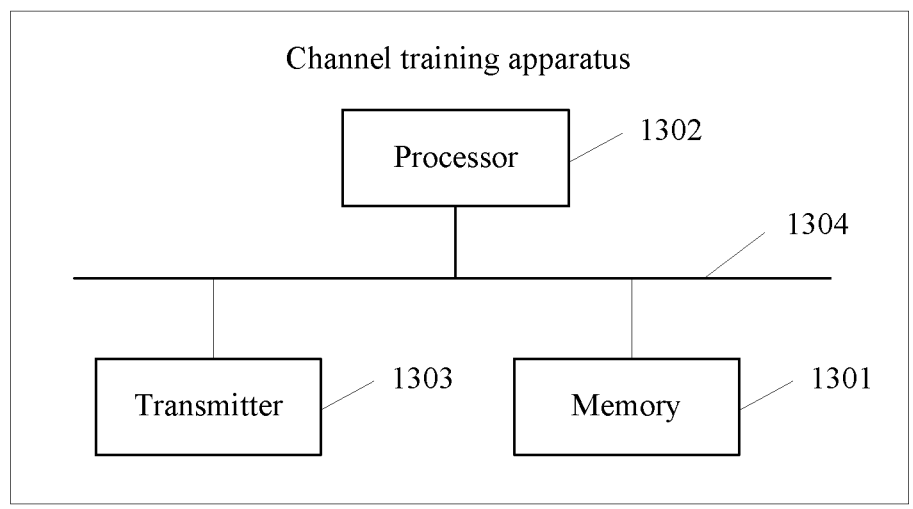
FIG. 13 is a schematic diagram of a logical structure of an OLT in a channel training method according to an embodiment of the present disclosure.

An embodiment of the present disclosure further provides a channel training apparatus. As shown in FIG. 13, FIG. 13 is a schematic structural diagram of hardware of the apparatus described in FIG. 10 to FIG. 12. The apparatus may include a memory 1301, a processor 1302, a transceiver 1303, and a bus 1304.

The memory 1301 may be a read-only memory (ROM), a static storage device, a dynamic storage device, or a random access memory (RAM). The memory 1301 may store an operating system and another application program. When the technical solution provided in this embodiment of the present disclosure is implemented by using software or firmware, program code used to implement the technical solution provided in this embodiment of the present disclosure is stored in the memory 1301, and is executed by the processor 1302.

The transceiver 1303 is configured for communication between the apparatus and another device or a communications network (for example, but is not limited to the Ethernet, a radio access network (RAN), or a wireless local area network (WLAN).

The processor 1302 may use a general-purpose central processing unit (CPU), a microprocessor, an application-specific integrated circuit (ASIC), or one or more integrated circuits to execute a related program, so as to implement the technical solution provided in this embodiment of the present disclosure.

The bus 1304 may include a channel used for transmitting information between all components (such as the memory 1301, the transceiver 1303, and the processor 1302) of the apparatus.

It should be noted that although only the memory 1301, the transceiver 1303, the processor 1302, and the bus 1304 are shown as hardware in FIG. 13, in a specific implementation process, a person skilled in the art should understand that the apparatus further includes other devices required for implementing normal operation. In addition, depending on specific requirements, a person skilled in the art should understand that hardware devices for implementing other functions may also be included.

Specifically, when the apparatus shown in FIG. 13 is configured to implement the apparatus shown in the embodiments of FIG. 10 to FIG. 12, the processor 1302 in the apparatus couples to the memory 1301 and the transceiver 1303, so as to determine a first moment for triggering channel training; and stop sending normal data from the first moment, and generate a training frame.

The transceiver 1303 is configured to send the training frame to all ONUs in the PON, so that a target ONU trains the automatic adaptive equalizer based on the training frame, where the target ONU is at least one of all the ONUs.

In another embodiment of the present disclosure, the processor 1302 is further configured to: generate a control signal when the first moment arrives, where the control signal is used to trigger the channel training; and stop sending the normal data by using the control signal, and generate the training frame, where the training frame includes a training identifier and a training sequence.

In another embodiment of the present disclosure, the processor 1302 is further configured to: periodically trigger the channel training by using a timer, where a moment for triggering the channel training is the first moment; and stop sending the normal data from each first moment, and generate the training frame, where the training frame includes a training identifier and a training sequence.

In another embodiment of the present disclosure, the processor 1302 is further configured to: replace an idle codeword at a physical coding sublayer PCS of the OLT with the training frame; and bypass a 64B/66B coding module and a scrambling module at the PCS.

In another embodiment of the present disclosure, the processor 1302 is further configured to: perform 64B/66B decoding and descrambling on the training frame; and replace an idle codeword at a physical coding sublayer PCS of the OLT with the training frame obtained after the 64B/66B decoding and the descrambling.

In another embodiment of the present disclosure, the processor 1302 is further configured to: add a re-training command to a downstream message when an abnormal ONU is detected, where the re-training command is used to instruct the abnormal ONU to reset the automatic adaptive equalizer, and the abnormal ONU is an ONU whose receiving bit error rate reaches a preset value; and determine a moment at which sending of the downstream message carrying the re-training command is complete as the first moment for triggering the channel training.

According to the channel training apparatus provided in this embodiment of the present disclosure, the processor determines the first moment for triggering the channel training, then stops sending the normal data from the first moment, and generates the training frame. The transceiver sends the training frame to all ONUs in the PON, so that the target ONU trains the automatic adaptive equalizer based on the training frame. Compared with the prior art, in which performance of a high-speed optical signal may deteriorate when being transmitted in an existing fiber, and consequently, a bit error rate in the optical signal received by the ONU is relatively high, thereby causing a relatively high power penalty, in this embodiment of the present disclosure, the first moment at which the channel training needs to be triggered is determined as the first moment after the system is powered on and operates normally. For example, a moment at which the ONU is connected may be determined as the first moment. Sending of the normal data is stopped from the first moment, and at this moment, the training frame starts to be sent, which may not damage the normal data. After receiving the training frame, the ONU uses the training sequence in the training frame to train the automatic adaptive equalizer, so as to improve the receiving sensitivity of the optical module of the ONU, so that the optical module of the ONU receives an optical signal with optimal operation performance, thereby reducing the bit error rate in the received optical signal and reducing a power penalty.

Based on the foregoing descriptions of the implementations, a person skilled in the art may clearly understand that the present disclosure may be implemented by software in addition to necessary universal hardware or by hardware only. In most circumstances, the former is a better implementation. Based on such an understanding, the technical solutions of the present disclosure essentially or the part contributing to the prior art may be implemented in a form of a software product. The computer software product is stored in a readable storage medium, such as a floppy disk, a hard disk, or an optical disc of a computer, and includes several instructions for instructing a computer device (which may be a personal computer, a server, a network device, or the like) to perform the methods described in the embodiments of the present disclosure.

The descriptions are only specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A channel training method, wherein the method is applied to a passive optical network (PON), the PON comprises an optical line terminal (OLT) and an optical network unit (ONU), the ONU comprises an automatic adaptive equalizer, the method comprising:
    determining a first moment for triggering channel training;
    generating a control signal when the first moment arrives for triggering the channel training;
    stopping sending the normal data by using the control signal;
    generating the training frame, wherein the training frame comprises a training identifier and a training sequence;
    replacing an idle codeword at a physical coding sublayer (PCS) of the OLT with the training frame;
    bypassing a 64B/66B coding module and a scrambling module at the PCS; and sending the training frame to all ONUs in the PON, for enabling a target ONU to train the automatic adaptive equalizer based on the training frame, wherein the target ONU is at least one of all the ONUs.

2. The channel training method according to claim 1, wherein determining the first moment for triggering channel training, comprises:
    periodically triggering the channel training by using a timer, wherein a moment for triggering the channel training is the first moment.

3. The channel training method according to claim 1, wherein determining the first moment for triggering channel training further comprises:
    adding a re-training command to a downstream message when an abnormal ONU is detected for instructing the abnormal ONU to reset the automatic adaptive equalizer, and the abnormal ONU is an ONU whose receiving bit error rate reaches a preset value; and
    determining a moment at which sending of the downstream message carrying the re-training command is complete as the first moment for triggering the channel training.

4. A channel training method, wherein the method is applied to a passive optical network (PON), the PON comprises an optical line terminal (OLT) and an optical network unit (ONU), the ONU comprises an automatic adaptive equalizer, the method comprising:
    determining a first moment for triggering channel training;
    generating a control signal when the first moment arrives for triggering the channel training;
    stopping sending the normal data by using the control signal;
    generating the training frame, wherein the training frame comprises a training identifier and a training sequence;
    performing 64B/66B decoding and descrambling on the training frame;
    replacing an idle codeword at a physical coding sublayer (PCS) of the OLT with the training frame obtained after the 64B/66B decoding and the descrambling; and sending the training frame to all ONUs in the PON, for enabling a target ONU to train the automatic adaptive equalizer based on the training frame, wherein the target ONU is at least one of all the ONUs.

5. A channel training method, wherein the method is applied to a passive optical network (PON), the PON comprises an optical line terminal (OLT) and an optical network unit (ONU), the ONU comprises an automatic adaptive equalizer, the method comprising:
    periodically triggering the channel training by using a timer, wherein a moment for triggering the channel training is a first moment;
    generating a control signal when the first moment arrives for triggering the channel training;
    stopping sending the normal data by using the control signal;
    generating the training frame, wherein the training frame comprises a training identifier and a training sequence
    performing 64B/66B decoding and descrambling on the training frame;
    replacing an idle codeword at a physical coding sublayer (PCS) of the OLT with the training frame obtained after the 64B/66B decoding and the descrambling; and
    sending the training frame to all ONUs in the PON, for enabling a target ONU to train the automatic adaptive equalizer based on the training frame, wherein the target ONU is at least one of all the ONUs.

6. A channel training apparatus, wherein the apparatus is applied to a passive optical network (PON), the PON comprises an optical line terminal (OLT) and an optical network unit (ONU) having an automatic adaptive equalizer, the apparatus comprising:
    a memory configured to store instructions; and
    at least one processor coupled to the memory, wherein the instructions, when executed by the at least one processor, cause the channel training apparatus to:
    determine a first moment for triggering channel training,
    generate a control signal when the first moment arrives for triggering the channel training;
    stop sending the normal data by using the control signal;
    generate the training frame, wherein the training frame comprises a training identifier and a training sequence;
    replace an idle codeword at a physical coding sublayer (PCS) of the OLT with the training frame;
    bypass a 64B/66B coding module and a scrambling module at the PCS; and
    send the training frame generated to all ONUs in the PON, for enabling a target ONU to train the automatic adaptive equalizer based on the training frame, wherein the target ONU is at least one of all the ONUs.

7. The channel training apparatus according to claim 6, wherein the instructions, when executed by the at least one processor, further cause the channel training apparatus to:
periodically trigger the channel training by using a timer, wherein a moment for triggering the channel training is the first moment.

8. The channel training apparatus according to claim 6, wherein the instructions, when executed by the at least one processor, further cause the channel training apparatus to:
add a re-training command to a downstream message when an abnormal ONU is detected for instructing the abnormal ONU to reset the automatic adaptive equalizer, and the abnormal ONU is an ONU whose receiving bit error rate reaches a preset value, and
determine a moment at which sending of the downstream message carrying the re-training command is complete as the first moment for triggering the channel training.

9. A channel training apparatus, wherein the apparatus is applied to a passive optical network (PON), the PON comprises an optical line terminal (OLT) and an optical network unit (ONU) having an automatic adaptive equalizer, the apparatus comprising:
a memory configured to store instructions; and
at least one processor coupled to the memory, wherein the instructions, when executed by the at least one processor, cause the channel training apparatus to:
determine a first moment for triggering channel training;
generate a control signal when the first moment arrives for triggering the channel training;
stop sending the normal data by using the control signal;
generate the training frame, wherein the training frame comprises a training identifier and a training sequence;
perform 64B/66B decoding and descrambling on the training frame;
replace an idle codeword at a physical coding sublayer (PCS) of the OLT with the training frame obtained after the 64B/66B decoding and the descrambling; and
send the training frame generated to all ONUs in the PON, for enabling a target ONU to train the automatic adaptive equalizer based on the training frame, wherein the target ONU is at least one of all the ONUs.

10. A channel training apparatus, wherein the apparatus is applied to a passive optical network (PON), the PON comprises an optical line terminal (OLT) and an optical network unit (ONU) having an automatic adaptive equalizer, the apparatus comprising:
a memory configured to store instructions;
at least one processor coupled to the memory, wherein the instructions, when executed by the at least one processor, cause the channel training apparatus to:
periodically trigger the channel training by using a timer, wherein a moment for triggering the channel training is a first moment generate a control signal when the first moment arrives for triggering the channel training;
stop sending the normal data by using the control signal;
generate the training frame, wherein the training frame comprises a training identifier and a training sequence;
perform 64B/66B decoding and descrambling on the training frame;
replace an idle codeword at a physical coding sublayer (PCS) of the OLT with the training frame obtained after the 64B/66B decoding and the descrambling; and
send the training frame generated to all ONUs in the PON, for enabling a target ONU to train the automatic adaptive equalizer based on the training frame, wherein the target ONU is at least one of all the ONUs.

11. A channel training system, comprising:
an optical network unit (ONU);
a passive optical splitter coupled to the ONU; and
an optical line terminal (OLT) coupled to the passive optical splitter, wherein the OLT comprises:
a memory configured to store instructions, and at least one processor coupled to the memory, wherein the instructions, when executed by the at least one processor, cause the OLT to:
determine a first moment for triggering channel training;
generate a control signal when the first moment arrives for triggering the channel training;
stop sending the normal data by using the control signal;
generate the training frame, wherein the training frame comprises a training identifier and a training sequence;
replace an idle codeword at a physical coding sublayer (PCS) of the OLT with the training frame;
bypass a 64B/66B coding module and a scrambling module at the PCS; and
send the training frame generated to all ONUs in the PON, to enable a target ONU to train the automatic adaptive equalizer based on the training frame, wherein the target ONU is at least one of all the ONUs.

* * * * *